United States Patent [19]

Bankier

[11] Patent Number: 5,287,973
[45] Date of Patent: Feb. 22, 1994

[54] BANANA CARRIER
[75] Inventor: Jack D. Bankier, Northbrook, Ill.
[73] Assignee: Bankier Companies, Inc., Glenview, Ill.
[21] Appl. No.: 10,185
[22] Filed: Jan. 28, 1993

Related U.S. Application Data

[62] Division of Ser. No. 744,415, Aug. 13, 1991, Pat. No. 5,199,580.
[51] Int. Cl.$^5$ .............................................. A47F 7/00
[52] U.S. Cl. ................................. 211/113; 206/557; 211/126
[58] Field of Search ................ 206/557; 211/115, 116, 211/113, 118, 107, 126, 127, 131, 144

[56] References Cited

U.S. PATENT DOCUMENTS

| | | |
|---|---|---|
| 727,107 | 5/1903 | Donaldson . |
| 1,740,520 | 12/1929 | Murphy . |
| 2,289,212 | 7/1942 | Rinnela . |
| 3,127,994 | 4/1964 | Campbell ............................ 211/144 |
| 3,750,563 | 8/1973 | Tonjum . |
| 4,006,559 | 2/1977 | Carlyon, Jr. . |
| 4,501,201 | 2/1985 | Fitzner et al. . |
| 4,736,856 | 4/1988 | Alneng et al. ...................... 211/131 |

Primary Examiner—Robert W. Gibson, Jr.
Attorney, Agent, or Firm—Hill, Steadman & Simpson

[57] ABSTRACT

A banana carrier, particularly a banana carrier is provided for transporting bananas on a plurality of trays from the picking fields to the packing area. The banana carrier is particularly adapted to be hung in rolling fashion on a cableway network arranged in the picking fields. The trays are arranged in stacked spaced apart fashion on the banana carrier. Each tray provides quarter panel sloped surfaces, circumscribed by drainage troughs which communicate to a drainage hole located in a central portion of each tray.

19 Claims, 4 Drawing Sheets

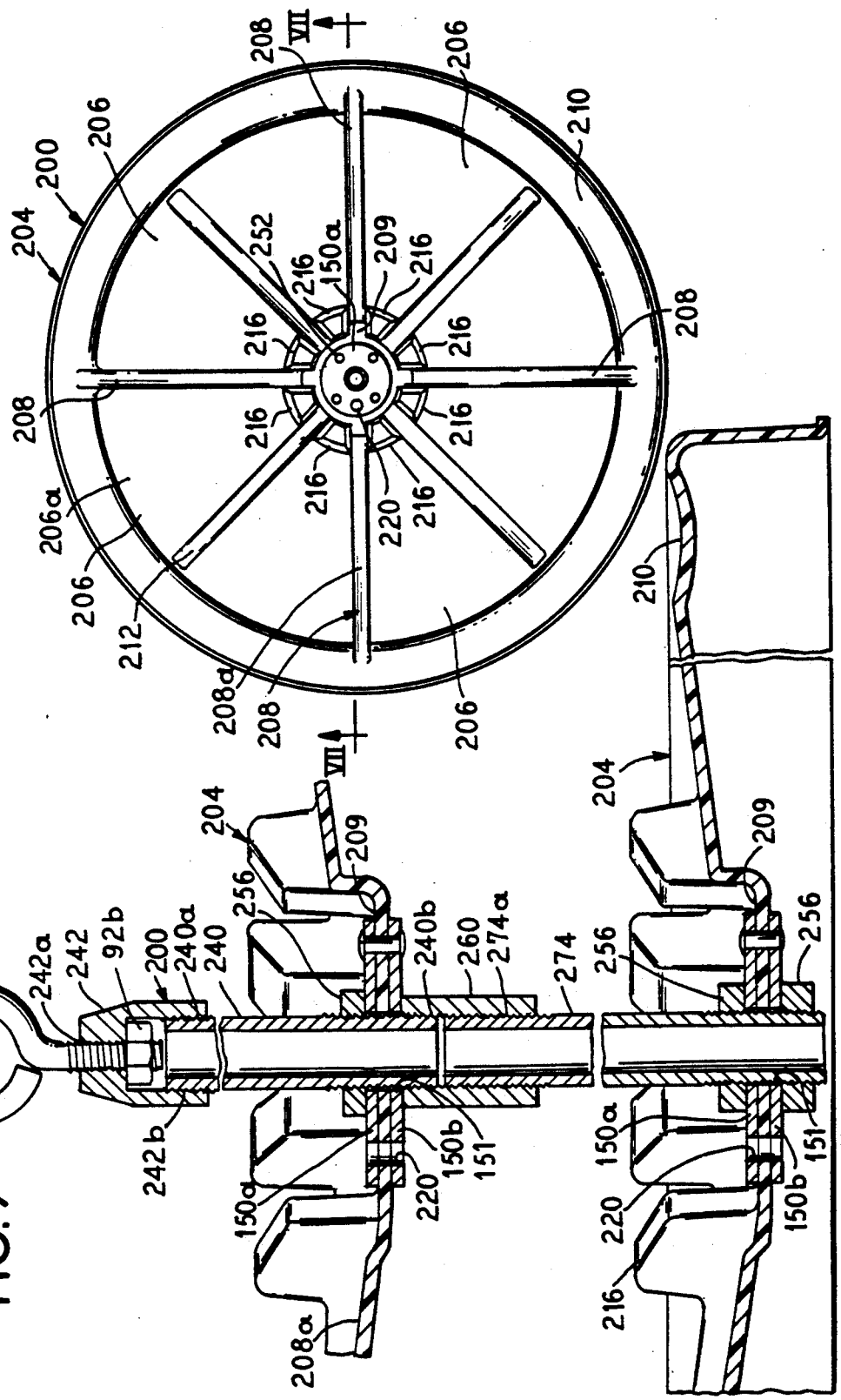

BANANA CARRIER

This is a division of application Ser. No. 744,415, filed Aug. 13, 1991, now U.S. Pat. No. 5,199,580.

BACKGROUND OF THE INVENTION

This invention relates to a cableway system used in agricultural fields to provide transportation of hand-harvested crops from the fields to the packing area. In particular, this invention relates to a tray arrangement for a banana carrier which hangs from the cableway system for effectively transporting bananas.

Cableway systems arranged throughout picking fields or farms for handling and transporting produce are known. It is also known to transport bananas along a cableway system by hanging the entire banana bunch from the cableway for transport.

It has been found however, that transporting the bananas in this manner by hanging the entire bunch results in a considerable amount of damaged or lost bananas, by the time the bunch reaches the packing area. The banana bunches can swing into stationary objects while being transported, such as supports for the cableway, causing bananas to bruise or separate from the bunch.

SUMMARY OF THE INVENTION

The present invention provides for an effective banana carrier which mounts to an overhead cableway for transporting bananas from the farm to the packing area. The invention reduces damage to the bananas by decreasing loads and stresses inherent in the prior art method of transport. The invention reduces the possibility of bruised or lost bananas along the farm to packing area route.

In the present invention, a number of trays are provided hanging in stacked, coaxial fashion from the cableway. In the field, the banana bunch is broken down and separated into smaller groupings or "hands" of bananas and arranged on the coaxially stacked trays in a spread out fashion such that bananas are not crushed under their own weight and are protected from damage by impact along the cableway. Additionally, as opposed to transporting bananas by hanging by the bunch, the banana carrier prevents the dropping off and loss of bananas en route to the packing area.

The trays provide in a space conservative arrangement, sufficient and effective platform space for arranging a bunch of bananas. Each tray provides a plurality of channels for draining latex or sap and water from the arranged bananas during transport. Thus, the weight on the arrangement is minimized as well as making packing operation more clean and effective.

The carrier provides trays constructed by lightweight formed material, reducing horsepower required to transport the carrier on the cableway and making the carrier easy to move about. The carrier also can provide an effective storage means for holding bananas.

BRIEF DESCRIPTION OF THE DRAWINGS

FIG. 4 is a sectional view taken generally along line IV—IV of FIG. 2; and

FIG. 6 is a plan view of an alternate embodiment of a banana carrier; and

FIG. 7 is a sectional view of the alternate embodiment of FIG. 6 taken generally along line VII—VII.

DETAILED DESCRIPTION OF THE PREFERRED EMBODIMENTS

Figure 1:
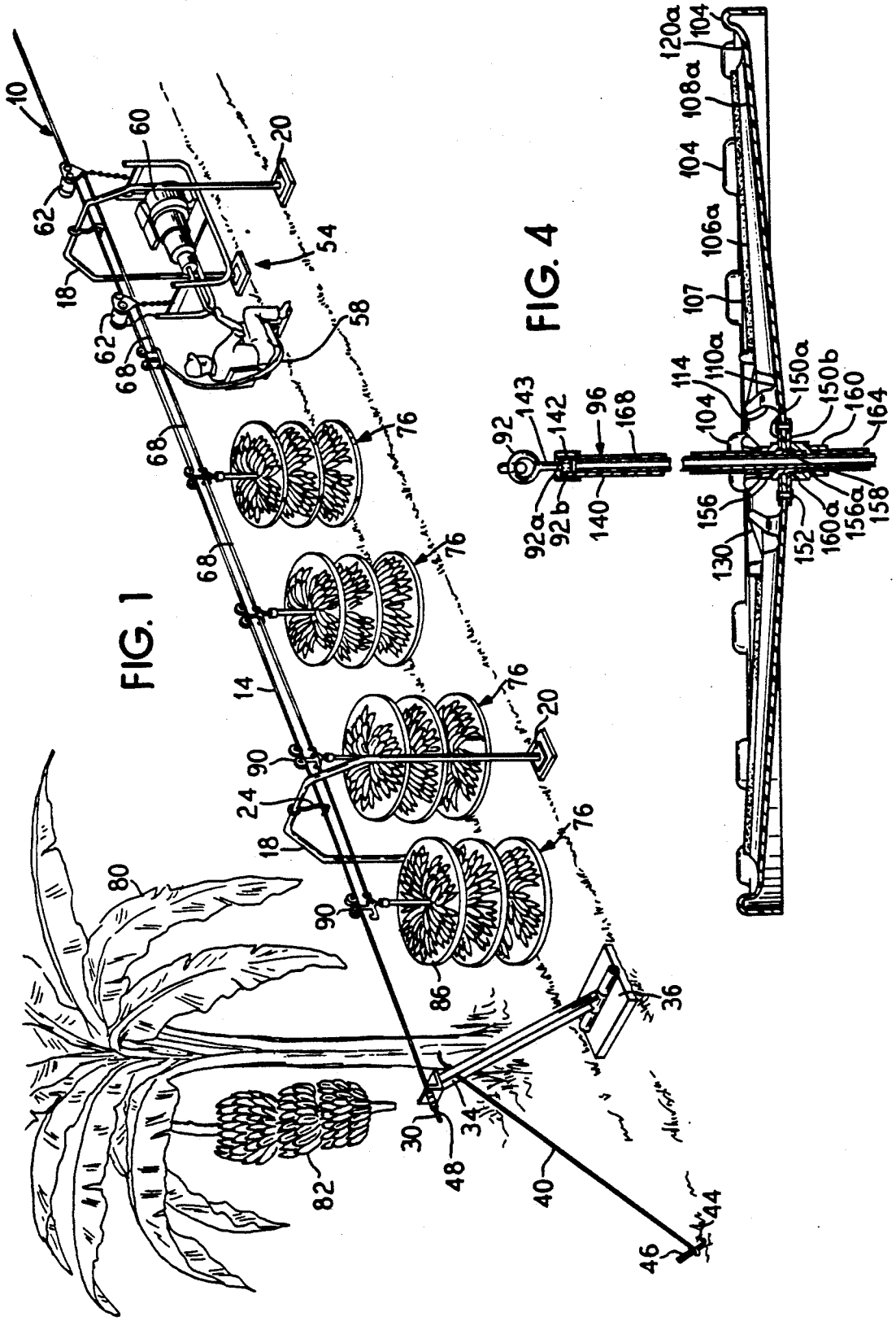
FIG. 1 is a perspective view of a cableway system and a plurality of banana carriers of the present invention riding thereon.

FIG. 1 shows an overhead cableway system generally at 10. The cableway system 10 comprises a cable 14 supported along its length by support arches 18 anchored into the ground at bases 20. The cable 14 is hung off the support arches 18 by support brackets 24. The cable 14 is tensed at its end 30 by an end post 34. The end post 34 is rotatably supported on a foundation 36. A diagonal cable 40 attaches an upper portion of the end post 34 to an earth anchor 44. The earth anchor 44 can be of several types suitable for the local soil conditions. A spike 46 is shown but a buried concrete anchor can just as well be used. Mounted at the end 30 of the cable 14 is a hydraulic ram 48 which can be hydraulically pressured to create sufficient tension for the cable 14 to operate.

Rolling from the cable 14 is a hanging tractor 54 providing an operator seat 58, and a diesel engine/hydraulic pump 60 powering two hydraulic drive motors 62 for propelling the hanging tractor along the cable 14. The diesel engine/hydraulic pump 60 is connected to the seat 58, which also hangs in rolling fashion on the track 14, by a pull rod 68. The pull rod 68 also attaches along its length to several banana carriers 76.

Also shown in FIG. 1 is a typical banana tree 80 holding a bunch 82 of bananas. A typical bunch 82 has 10 to 14 hands 100 shown in FIG. 3. A hand is a grouping of bananas.

Each banana carrier 76 holds thereon a plurality of trays 86, in this case three trays 86 are shown. A typical bunch 82 of bananas can be held on one carrier 76. A plurality of bunches 82 of bananas have been separated into hands and arranged on the trays 86. By separating the bunch and arranging the bananas onto the carrier 76, the bananas are supported spread out such as to reduce weight on the lower bananas, and also protects the bananas from impact such as against the support arches 18, and prevents bananas from falling off the bunch during transport from the field to the packing area.

Figure 2:
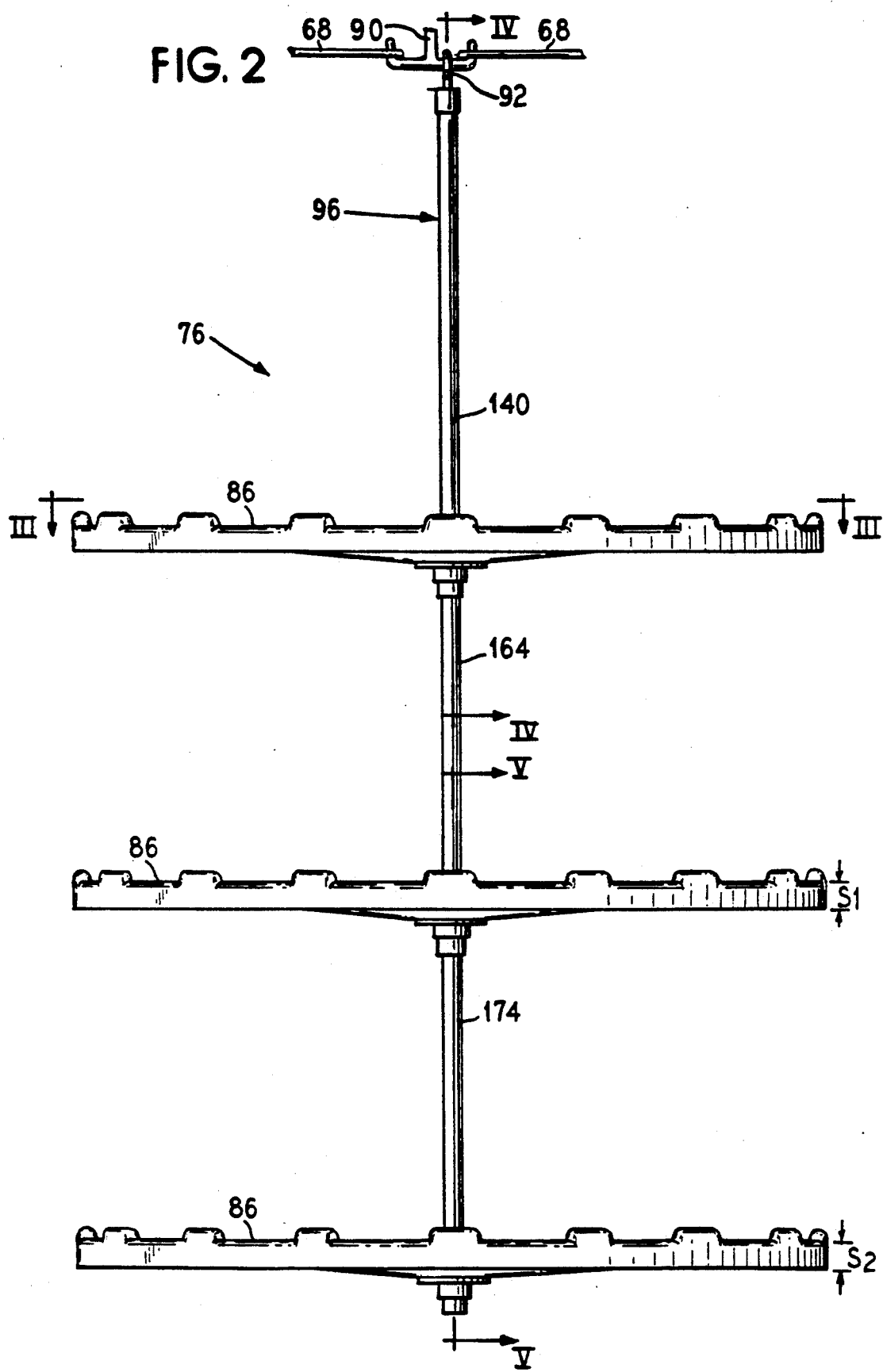
FIG. 2 is an elevational view of one banana carrier of the present invention.

FIG. 2 shows a banana carrier 76 in more detail. The banana carrier 76 is supported on a roller 90 (shown in detail in FIG. 1). The roller 90 is progressed along the cable 14 by the pull rod 68. The banana carrier 76 is supported from the roller 90 by a hook 92 engaged thereon. The hook 92 is mounted to a support shaft 96 whereon is mounted the three trays 86. Although three trays 86 are shown, any number of trays hanging from a shaft 96 are encompassed by the present invention. Where more than 12 hands are present on the bunch a four tray carrier can be utilized. The trays 86 are shown to have a relatively thin profile allowing adequate distance between trays for loading bananas.

In an advantageous arrangement of the banana carrier the top most tray 86 is a 32 inch diameter tray, the middle tray 86 is a 34 inch tray with a thin skirt thickness S1, and the bottom most tray is a 34 inch diameter tray with a thick skirt thickness S2. This provides advantageous spacing and clearances for loading the bananas.

Figure 3:
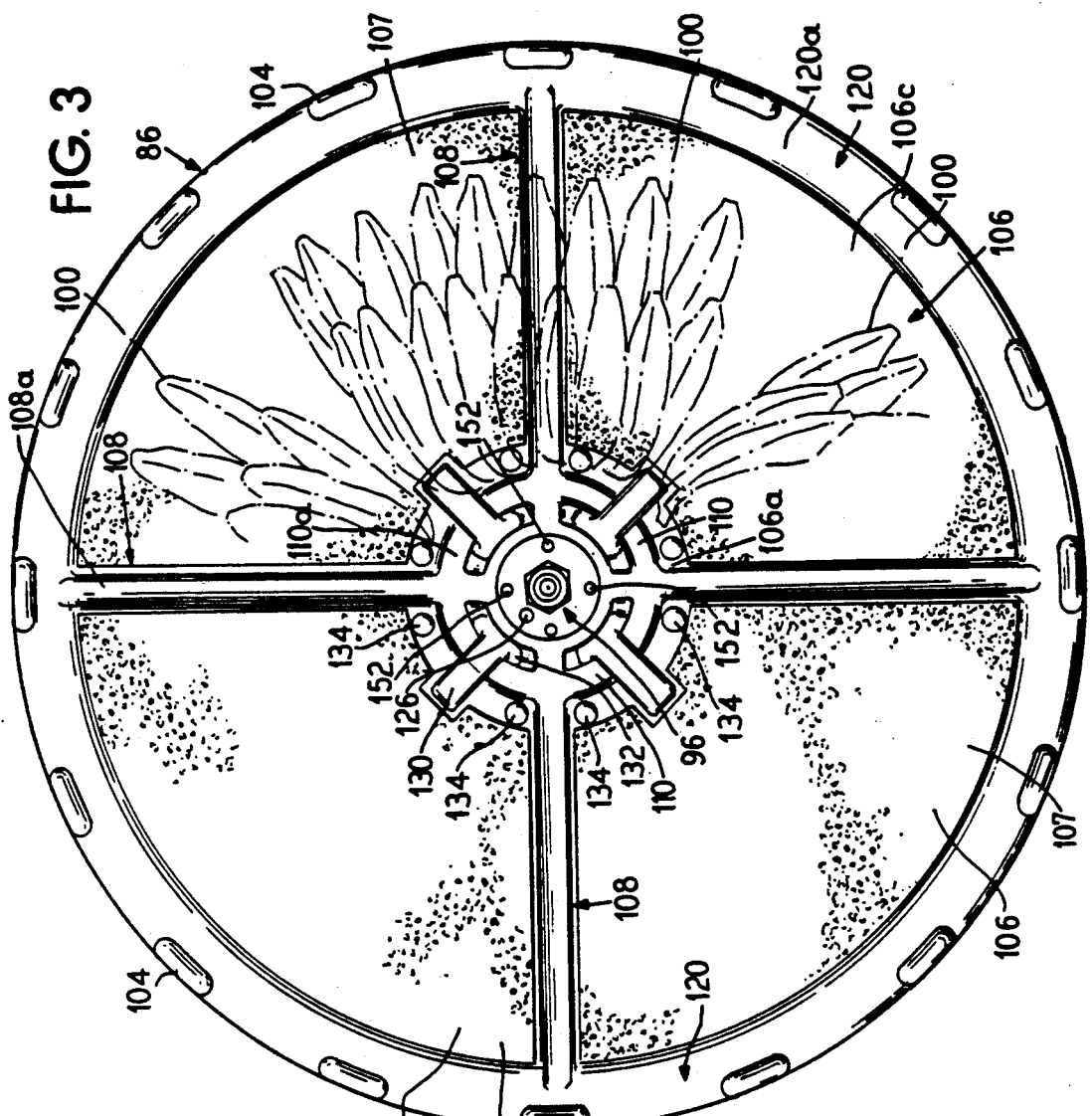
FIG. 3 is a sectional view taken generally along line III—III of FIG. 2.

FIG. 3 shows the working surface of the tray 86 with a hand of bananas 100 laying thereon. The tray 86 has arranged thereon a plurality of endstops 104 around its periphery to help retain bananas onto the tray. The tray 86 provides four quarter panels 106 having support surfaces 106a, separated by four spoke troughs or cross troughs 108. When bananas are freshly cut, a latex or sap leaks out of the cut stalk or stem. The latex is difficult to clean off the bananas once deposited thereon. The cross troughs provide drainage channels for this latex and are formed having a bottom floor 108a lower than said support surfaces 106a of said quarter panels 106 at any adjacent point. Liquid collecting on quarter panels 106 can flow into the cross troughs 108. Each cross trough 108 intersects for flow with an arcuate trough 110, each of which intersects for flow with a short trough 112 which empties into a center bowl 114. Surrounding the quarter panels 106, and flow intersecting with the cross troughs 108, is a peripheral trough 120. The peripheral trough 120 and the arcuate troughs 110 have floor elevations 120a, 110a lower than the adjacent support surface 106a. The bottom floors 108a can slope smoothly from the floor elevations 120a at the peripheral trough to the floor elevation 110a at the arcuate troughs.

Thus, the peripheral trough 120, the cross troughs 108, and the arcuate troughs 110, all can collect fluids for guiding those fluids into the short trough 112 and eventually into the bowl 114. The bowl 114 has therein located a drain hole 126 for passing those fluids such as the banana latex out of the tray 86.

It is seen in FIG. 3 that the hand of bananas 100 fits effectively over an area approximately the area of a quarter panel 106 except rotated 45° with a stem end of the bananas fitting into or over the cross trough 108 at a narrow end 106b of the quarter panels 106 and free ends of the bananas fanning out toward a wider end 106c of the quarter panels 106. By putting the cut stem of the hand 100 over the trough 108 any latex seeping thereout deposits directly into the trough. If the hands are arranged with the cut stem facing outwardly the peripheral trough 120 can collect the latex directly from the cut stem arranged thereover.

Also shown in FIG. 3 are four T-shaped formations 130 formed raised above the quarter panels 106, with a head 132 of each formation 130 defining the bowl 114 and the short troughs 112. Additionally, each quarter panel 106 has formed thereon two abutment knobs 134. The T-shaped formation 130 and the abutment knobs 134 retain the bananas 100 onto the quarter panel and keep the bananas from encroaching into the bowl 114 and thereby clogging drainage of the tray 86.

The cross troughs 108 formed into the tray 86 serve the further function of forming stiffening members or ribs to strengthen the tray 86. The T-shaped formations 130 also strengthen the tray and strengthen the bowl 114 of the tray wherein high stresses can accumulate due to the hanging weight of the tray onto the shaft 96. In fact, the peripheral trough 120, the arcuate troughs 110, and the end stops 104 being formed onto or beneath the tray surface all serve to structurally rigidify the tray as opposed to a thin flat surface.

FIG. 3 shows a pad 107 substantially covering the quarter panels 106 on top of the support surface 106a. This pad 107 can comprise a quarter inch thick polyfoam material or any other suitable material with a suitable thickness. The purpose of the pad 107 is to provide a cushion for protecting the bananas which are placed upon the support surface 106a. By providing this cushion, the bananas are further protected from bruising. The cushion preferably is selected to allow drainage of the latex therethrough and into the appertaining troughs. Although the pad 107 is shown, the banana tray 86 can be provided without any such pad 107.

FIG. 4 shows the quarter panels 106 being sloped toward the bowl 114 from an outside diameter of the panels toward an inside diameter of the panels. The end stops 104 are shown raised above the quarter panels 106. The peripheral trough 120, the arcuate trough 110 are shown recessed below the surface 106a of the quarter panel 106. Likewise, the bowl 114 is shown recessed below the surfaces 106a of the quarter panels 106. The shaft 96 is shown in more detail. In the preferred embodiment the shaft 96 comprises an outer plastic member such as made by plastic pipe components as are readily available. An outer pipe 140 is topped with a cap 142, the cap 142 having a hole 143 therethrough, for receiving the hook 92 at a threaded end portion 92a. The threaded end portion 92a of the hook 92 fits through the hole 143 and a nut 92b mounts thereon abutting the end cap 142. Thus, the hook 92 can support the end cap and the outer pipe 140 glued thereto.

In the bowl 114 there is mounted centrally a reinforcing washer 150a which is riveted through the bowl 114 to a mating reinforcing washer 150b located on a bottom side of the bowl 114. The reinforcing washer 150a and the mating reinforcing washer 150b can be identical pieces. In this embodiment four rivets 152 are used through the bowl 114 to mate the two washers 150a, 150b. The pipe 140 terminates at the bowl 114 in a first coupling 156 glued to the pipe 140 with a downward extending threaded portion 156a which proceeds through a central aperture 158 formed through both the reinforcing washers 150a, 150b and the bowl 114. Below the mating reinforcing washer 150b, a second coupling 160 with a female threaded portion 160a extending upwardly, engages with the male threaded portion 156a of the first coupling. Thus, the tray is captured between the first coupling 156 and the second coupling 160. A second pipe 164 is glued into the second coupling 160 and extending downwardly. Inserted inside the first pipe 140 and extending downwardly through the first and second couplings and through the second pipe 164 is a steel rod or pipe 168 which provides bending rigidity to the shaft 96 along its length.

FIG. 4 also shows the pad 107 mounted on top of the support surface 106a to provide a cushion for the bananas placed thereon. The cushion can be adhesively attached to the support surface 106a or have appropriate cut-outs for receiving appurtenances of the tray to effectively retain the pad 107 onto the support surface 106a.

Figure 5:
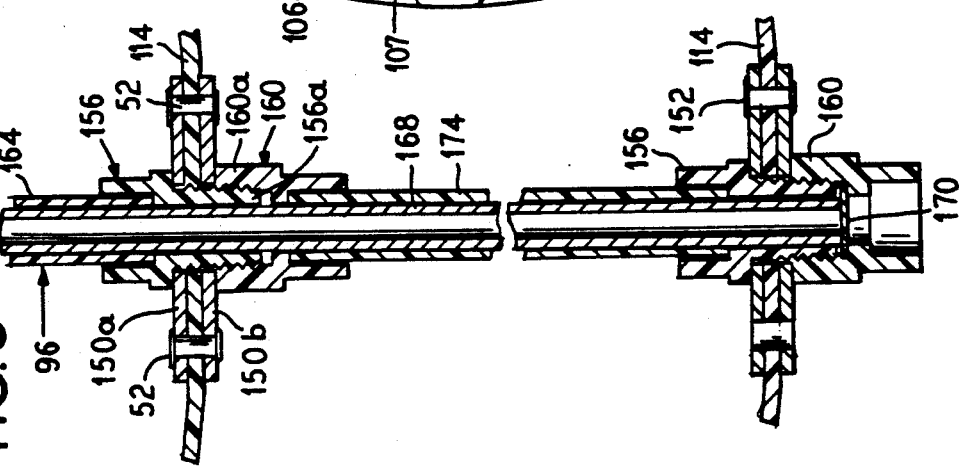
FIG. 5 is a sectional view taken generally along line V—V of FIG. 2.

FIG. 5 shows the shaft 96 in more detail showing portions of two trays 86 arranged therealong. Into the second coupling 160 which is located at a bottom tray 86 of the banana carrier 76, a stop plate 170 is inserted. The steel rod 168 is retained into the banana carrier 76 by setting upon this stop plate 170. The steel rod 178 is otherwise not required to be attached to the end caps or the plastic pipes 140, 164, and 174 shown in FIG. 5.

FIG. 6 shows an alternate embodiment of the banana carrier 200. Shown is a top tray 204 having four quarter panels 206. The quarter panels are bordered by radial troughs 208, a peripheral trough 210, and a central circular area 209. Additionally, intermediate troughs 212 can be arranged on the quarter panels 206 to assist in draining banana latex down into the central area 209. The radial troughs 208 function to remove banana latex, water or other fluids from the peripheral trough 210 down into the central area 209 and also can receive fluids from the quarter panels along the length of the radial troughs 208. Surrounding the central circular area 209, which is recessed lower than the top surface 206a of the quarter panels 206, are located elevations 216. The elevations 216 are spaced around a perimeter of the central circular area 209 in between radial troughs 208 and central troughs 212. The elevations 216 restrain bananas from entering and clogging the central area 209. A drainage hole 220 is provided in the central area 209 to drain the accumulation of latex water or other fluids.

FIG. 7 shows in more detail the structure of the banana carrier 200. Portions of two trays 204 are shown although three or more trays can be utilized also. The hook 92 with the nut 92b are retained from the previous embodiment. The hook and nut are captured by a closure cap 242 having an open female threaded end 242b. The closure cap has at a second end or top end an aperture 242a for receiving the hook therethrough to be captured therein. A pipe section 240 having a threaded first end 240a and a threaded second end 240b is arranged from the closure cap through a central aperture 151 of the central circular area 209. Similar to the previous embodiment reinforcing washers 150a, 150b are utilized on opposite sides of the central area 209. The pipe section is threaded into the closure cap 242 to be held thereby. The second threaded end 240b is inserted through the aperture 151 and captured beneath the central area 209 by a threaded coupling 260 threaded onto the second end 240b. A lock nut 256 is employed on top of the central area 209 and threaded onto the pipe section 240. Thus, the lock nut 256 and the threaded coupling 260 tightly capture the central area 209 and the reinforcing washers 150a, 150b therebetween. The threaded coupling 260 has threaded thereinto a second pipe section 274 arranged axially with the first pipe section 240. The second pipe section is inserted through the aperture 151 and captured on either side, top and bottom, of the central area 209 of the bottom tray 204 with lock washers 256.

In the preferred embodiment, the pipe is ¾ inch threaded pipe. The closure cap 242 is actually a ¾ inch—¼ inch pipe reducer. The hook or eye bolt is a ⅜ inch eye bolt.

In a preferred embodiment, the trays are formed and molded from plastic which makes them cost effective, lightweight, durable and rust-free. The various troughs, elevations, and formations formed thereon perform drainage and banana retaining functions and also serve to strengthen the plastic tray as discussed above. The pipes 140, 164, 174 and the plurality of end caps and couplings, are all commercially available plastic pipe fittings. The pipes 240, 274 can be steel, galvanized steel, stainless steel, aluminum, or other metal. The reinforcing washers 150a, 150b are metal structural elements. However, the invention is not limited to the particularly described materials of construction as other appropriate materials of construction such as steel, aluminum or other metals, plastic, wood or canvas is encompassed by the present invention.

Although the present invention has been described with reference to a specific embodiment, those of skill in the art will recognize that changes may be made thereto without departing from the scope and spirit of the invention as set forth in the appended claims.

I claim as my invention:

1. A banana carrying tray comprising:
   a surface for arranging bananas thereon;
   a recessed central area, said surface sloped toward said central area;
   a drainage hole arranged in said central area through said tray; and
   a trough formed into said surface and sloped toward said central area, said trough communicating for flow into said central area.

2. A banana carrying tray according to claim 1 further comprising three additional troughs, said trough and said three additional troughs arranged radially extending from said central area to an outside perimeter of said surface, dividing the surface into four panel segments.

3. A banana carrying tray according to claim 1, wherein said tray comprises at least one additional trough formed into said surface, arranged sloping toward said central area of said tray, said trough and said at least one additional trough dividing said surface into panel segments.

4. A banana carrying tray according to claim 3, wherein said surface is circumscribed by a peripheral trough, said peripheral trough arranged to drain into said trough and said at least one additional trough.

5. A banana carrying tray according to claim 3, wherein said tray is circular in shape and said panel segments comprise four quarter panels of said tray.

6. A banana carrying tray according to claim 5, wherein said tray further comprises a plurality of end stop members arranged around a periphery of said tray.

7. A banana carrying tray according to claim 5, wherein each said quarter panel comprises at its inner side raised formations for retaining said bananas laying thereon.

8. A banana carrying tray according to claim 5 further comprising a reinforced central aperture for receiving a means for hanging said tray therefrom.

9. A banana carrying tray according to claim 1 further comprising a cushion pad overlying said surface.

10. A banana carrying tray according to claim 9, wherein said cushion pad comprises a polyfoam pad adhesively secured to said surface.

11. A banana carrying tray according to claim 1, wherein said tray further comprises a plurality of end stop members arranged around a periphery of said tray.

12. A banana carrying tray according to claim 1, wherein said surface comprises a plurality of raised formations spaced apart and surrounding said recessed central area for retaining said bananas on said surface and out of said recessed central area.

13. A banana carrying tray according to claim 2, further comprising four intermediate troughs, each intermediate trough located centrally within each of said four panel segments and extending radially from said recessed central area to said outside perimeter of said surface.

14. A banana carrying tray according to claim 13, wherein said surface is circumscribed by a peripheral trough, said peripheral trough arranged for flow communicating into said trough and said three additional troughs.

15. A banana carrying tray according to claim 14, wherein said tray further comprises a plurality of end stop members arranged around a periphery of said peripheral trough; and wherein each of said four panel segments comprises at its radially inward side, raised formations for retaining said bananas into said four panel segments.

16. A banana carrying tray according to claim 15 further comprising a reinforced central aperture for receiving a means for hanging said tray therefrom.

17. A banana carrying tray according to claim 16 further comprising a cushion pad overlying said surface.

18. A banana carrying tray according to claim 1 further comprising a reinforced central aperture for receiving a means for hanging said tray therefrom.

19. A banana carrying tray according to claim 2 further comprising a cushion pad overlying said surface.

* * * * *